2,912,388

RUBBER-RESIN CUTTING PADS AND METHODS OF MIXING AND MILLING RUBBER-RESIN COMPOSITIONS

James F. Leahy, Beverly, and John P. Szumski, Marblehead, Mass., assignors to United Shoe Machinery Corporation, Flemington, N.J., a corporation of New Jersey No Drawing. Application September 7, 1956
Serial No. 608,440

9 Claims. (Cl. 252—511)

This invention relates to synthetic rubber compounding and particularly to making hard, tough conductive rubber-resin cutting pads.

The usual procedure for combining rubbers, including synthetic rubbers, with resins, fillers, and curing agents is to introduce the rubber to the mill and work it on the mill until it becomes somewhat plastic, and thereafter add the resinous materials, filling materials, and curing agents. The milling is relied on to form an intimate mixture of the components as well as to reduce the mixture to a continuous form suitable for molding.

Certain rubber mixes are extremely stiff and hard to work on the rubber mill. The mix for the extremely tough cutting pads for die cutting is a case of this kind. The rubber and resin of this mix and the very high carbon black content make the mix very hard to work. It has been found difficult to complete the mixing in of the various additives without precuring or scorching the batch.

An improved die cutting press is described in the application of Frank Seabury II, and Robert W. Bradley under the title "Presses for Cutting Blanks from Sheet Material," Serial No. 409,670, filed February 11, 1954, now U. S. Patent No. 2,788,070. In that press an electrical control circuit through a press platen, die, and conductive cutting surface operates to move the platen away from the cutting surface when the die is forced into contact with the cutting surface. For effective operation of this press the conductivity of the cutting surface should be relatively high. Since working of the mixture containing carbon black progressively reduces the conductivity, it is important to reduce the amount of working.

It is a feature of the present invention to provide a rapid and simple method and article for mixing and molding rubber compositions particularly stiff mixes including a rubber or synthetic rubber, a high proportion of carbon black and a resin.

It is a further feature to provide a new cutting pad comprising a new rubber base compound having improved conductivity characteristics.

According to the method of the present invention, resin, fillers and other additives are thoroughly mixed in powdered form and then introduced into an agitating device which may be a tumbling drum. The agitating device is set in operation, and a liquid rubber dispersion is sprayed into the agitated powdered material at a rate such that it is taken up by the powder and does not collect as a liquid body. The sprayed liquid wets the surfaces of the powder particles and causes them to agglomerate into pellets, each pellet containing substantially all of the components desired in the final mixture. The pellets are then dried to a firm but readily crumbled condition.

The dried, substantially dust-free pellets are fed to a mill, for example, a roll-type rubber mill. In the mill the pellets break down at the nip of the rolls in a manner resulting in rapid banding and the formation of a homogeneous sheet in a much more rapid and clean fashion than has heretofore been obtainable.

The method is of particular value in preparing mixtures of a natural or synthetic rubber, a rubber reinforcing resin and fillers such as reinforcing furnace carbon black which form stiff milling compounds. The method will be described particularly in connection with the mixing of high acrylonitrile content butadiene acrylonitrile copolymers, e.g. copolymers containing about 30% to 45% of acrylonitrile, with high proportions of carbon black and thermosetting or curing type resins, e.g., phenol aldehyde resins, to form conductive cutting pads, but it will be understood that the method is useful in the preparation of other mixtures.

A useful composition for the manufacture of conductive cutting pads may comprise 100 parts by weight of a butadiene acrylonitrile copolymer containing at least 30% by weight of acrylonitrile, from about 60% to about 100% by weight based on the weight of the copolymer of a synthetic reinforcing resin, preferably the resinous reaction product of cashew nutshell oil and another phenol with sufficient aldehyde to make the resinous product thermosetting (see U.S. Letters Patent 2,203,206, granted June 4, 1940, on an application of Alvin F. Shepard) and from 70% to 120% by weight based on the weight of the copolymer of a reinforcing carbon black. In a preferred form the composition will also include from 2% to 25% by weight of the copolymer of a polyethylene glycol having a molecular weight of from 1000 to 6000.

In compounding such a mix according to the present invention, the resinous reaction product in powdered condition is mixed with other powdered components including curing agents for the resin and for the copolymer, e.g., hexamethylene-tetramine and sulfur, and with the high percentage of carbon black. This powdered mixture is reduced to pelletized or granular form by placing the mixture in a tumbling drum equipped with a reel type mixer and spraying into the tumbling powder an aqueous emulsion or latex of the butadiene acrylonitrile copolymer. The emulsion or latex wets the surfaces of the powder particles and adheres adjacent particles together to form aggregates which become rounded pellets or granules through the tumbling action. By using a high solids content latex it has been found that pellets containing from 1:2 to 2:1 parts of the rubbery copolymer to the parts of powdered resin and carbon black are readily obtainable.

It is possible to introduce a portion or all of the rubbery material in powdered form mixed with the resin and to use other binding liquids. For example, a natural or synthetic rubber latex or a relative dilute organic solvent solution of a rubber or a resin in a volatile solvent may be sprayed into the tumbling powder.

When the pellets are formed, they are ordinarily discharged from the tumbler and disposed in a drying tray or on a drying surface. Heat and circulation of air may be employed to speed up the rate of evaporation of the liquid, care being taken to avoid temperatures which would cause curing of the components of the pellets.

It is also possible, for example, by using a more dilute latex or use of tacky resin additives or even by control of drying conditions, e.g. the use of drying temperatures close to but below the curing temperature to provide tackier condition of the pellets which will cause them to adhere weakly together in the form of a blanket or sheet after the liquid is evaporated.

When drying is complete, the batch of separate pellets or the sheet or blanket of cohered pellets is introduced into a rubber mill. Where a roll type rubber mill is used, it is found that the pellets are caught in the nip of the rolls and spread rapidly as a band around the rolls to effect the desired completion of milling. The pellets joined in sheet or blanket form also spread readily as a band on the mill and the use of the sheet or blanket form offers some advantage in ease of handling in placing the material on the mill.

The mixing characteristics of the resin-rubber composition and the conductivity of the final molded article are markedly improved by inclusion in the mix of a substantial proportion of one or more of the higher polyethylene glycols. The polyethylene glycol addition reduces the stiffness of the resin-rubber mix on the mill so that working and blending is faster and easier. This improvement in itself minimizes loss of conductivity caused by working of the carbon black containing mixture. It appears moreover that the polyethylene glycol has a positive action in improving conductivity characteristics. That is, known processing aids which plasticize the synthetic rubber component making milling easier but give products which are lower in conductivity initially than products containing polyethylene glycols. Furthermore, products plasticized with conventional processing aids tend to lose conductivity during use, while products containing polyethylene glycol maintain their conductivity. It appears that there is a special relation between the polyethylene glycol and the carbon black which aids in maintaining conductivity, particularly under distortion, whether during milling, or, in the final molded article, during cutting operations. The desirable action of the polyethylene glycols is obtained whether they are incorporated in the cohered pellets or whether they are added in the conventional milling procedure. In both cases they improve speed and ease of mixing and give products possessing initial and sustained high levels of conductivity.

Polyethylene glycols in the molecular weight range of from 1000 to 6000 or more have been found useful. The higher molecular weight materials are preferred, and the materials commercially available as Carbowax Nos. 4000 and 6000 are particularly useful. These materials are solids and are readily combined with other ingredients of the mix in the form of pellets. It is preferred to use about 15% by weight of the polyethylene glycol based on the weight of the synthetic rubber, but as low as 2% by weight and as high as 25% by weight based on the weight of the synthetic rubber may be used.

Cutting pads molded of the compositions of the present invention including a rubber, a reinforcing resin, polyethylene glycol and carbon black will possess the following physical characteristics as determined by ASTM tests which fit them for operation as a cutting pad.

Hardness=Shore "D," 60 to 85, and
Tensile strength at least 2500 lbs. per square inch.

These cutting pads will also have a conductivity, as determined in a die cutting press through the control circuit including the die cutting press platen, a two inch diameter metallic die, and the cutting pad, of not more than about 10,000 ohms after 10,000 cycles of die cutting leather, which fits them for use in the electrically controlled die cutting press of Seabury and Bradley referred to above.

The following examples are given as of possible assistance in understanding the invention, but it will be understood that the invention is not restricted to materials, proportions, or specific procedures set forth in the examples.

*Example 1*

The following powders were mixed in the proportions indicated:

| | Parts by weight |
|---|---|
| Cashew nutshell oil modified phenol aldehyde resin (Durez resin 12686) | 85 |
| Zinc oxide | 6.6 |
| Sulfur | 1.9 |
| Commercial rubber vulcanization accelerator | 1.9 |
| Stearic acid | 1.9 |
| Commercial antioxidant | 1.3 |
| Commercial anti-scorch agent | 1 |
| Hard, waxy polyethylene glycol (molecular weight 4000) | 14.1 |
| Coumarone-indene resin | 4.7 |
| Reinforcing furnace carbon black | 150 |

After mixing the above powdery materials, they are introduced into a tumbling drum having a stationary reel agitator, and a butadiene acrylonitrile copolymer (38% acrylonitrile) synthetic rubber latex (51.6% solids) was sprayed into the agitated powder. In all, 242 parts by weight of the latex (125 parts by weight solids) were introduced over a period of about five minutes. At the end of five minutes, the powdery material had agglomerated into pellets having an average diameter of about ⅜". These pellets were spread out in trays in layers approximately 1" thick and were subjected to circulating air warmed to about 120° F. At the end of 24 hours the pellets were found to be dry and friable.

The batch of pellets was introduced onto a two-roll rubber mill and banded promptly. Eight parts by weight of hexamethylene tetramine powder was then added and formed a homogeneous mixture which was sheeted out at the end of about four minutes of milling. Four one-fourth inch thick sections of the rolled sheet were assembled in a press and cured at a temperature of 300° F. for 30 minutes.

The resultant product was a hard, tough sheet material having a durometer of about 82 on the Shore "D" scale and a tensile strength of about 3000 pounds per square inch and was found useful as a cutting pad in the electrically controlled die cutting press of Seabury and Bradley referred to above.

*Example 2*

The following materials were mixed on a water-cooled rubber mill, the components being added to the mill in the order named and milling continued for about twenty minutes.

| | Parts by weight |
|---|---|
| Butadiene acrylonitrile copolymer synthetic rubber (40% acrylonitrile) | 125 |
| Diphenyl amine | 1 |
| Zinc oxide | 6.6 |
| Sulphur | 1.9 |
| Cashew nutshell oil modified phenol aldehyde resin (Durez 12686) | 37.8 |
| Reinforcing furnace carbon black | 100 |
| Commercial antioxidant | 1.3 |
| Stearic acid | 1.9 |
| Polyethylene glycol (molecular weight 1540) | 18.8 |
| Reinforcing furnace carbon black | 50 |
| Thermosetting cashew nutshell oil modified phenol aldehyde resin (Durez 12687) | 40.8 |
| Hexamethylenetetramine | 3.2 |
| Commercial rubber vulcanization accelerator | 1.9 |

On the completion of mixing and milling of the above components the compound was sheeted out. Four ¼" thick sections of the rolled sheet were assembled in a press and cured at a temperature of 300° F. (80 lbs. steam pressure) for 30 minutes.

The resultant product was a hard, tough sheet material having a durometer of 82 on the Shore "D" scale and a tensile strength of about 3000 pounds per square inch. The product was usable as a cutting pad in a power die cutting press in which the downward movement of the die press platen is stopped and upward movement initiated by a completion of the electrical circuit between the die pressing platen, the metal die and the cutting surface.

In an accelerated test cutting leather with a 2" diameter die, the initial resistance through the platen, die and cutting pad was 4 ohms. After 10,000 cycles of die cutting leather, the resistance had risen to only 2500 ohms.

*Example 3*

The following components were mixed under the same conditions as the components of Example 2:

| | Parts by weight |
|---|---|
| Butadiene acrylonitrile copolymer synthetic rubber (40% acrylonitrile) | 125 |
| Diphenyl amine | 1 |
| Zinc oxide | 6.6 |
| Sulphur | 1.9 |
| Cashew nutshell oil modified phenol aldehyde resin | 37.8 |
| Reinforcing furnace carbon black | 100 |
| Commercial antioxidant | 1.3 |
| Stearic acid | 1.9 |
| Ethyl phthalyl ethyl glycolate | 25 |
| Reinforcing furnace carbon black | 50 |
| Thermosetting cashew nutshell oil modified phenol aldehyde resin | 40.8 |
| Hexamethylenetetramine | 3.2 |
| Commercial rubber vulcanization accelerator | 1.9 |

After completion of the milling the mixture was sheeted out. Four ¼" thick sections of the rolled sheet were assembled in a press and cured at a temperature of 300° F. (80 lbs. steam pressure in the platen) for 30 minutes.

The resultant product was a hard, tough sheet material having a durometer of 77 on the Shore "D" scale and a tensile strength of about 3000 pounds per square inch.

In an accelerated cutting test conducted as in Example 2, the initial resistance through the die pressing platen, die and cutting pad was 7 ohms. After 3000 cuts the resistance of the pad had risen to 25,000 ohms. After 4000 cuts the resistance had risen to over 100,000 ohms in certain areas and the test had to be discontinued because the resistance of the cutting pad was too high to operate the electrical controls of the machine.

Having thus described our invention, what we claim as new and desire to secure by Letters Patent of the United States is:

1. In molding a hard, tough, conductive rubber composition, the method which comprises agglomerating substantially the entire rubber mix into pellets including the steps of mixing together from 60 to 100 parts by weight of powdered thermosetting resin, from 70 to 120 parts by weight of powdered conductive carbon black and powdered vulcanizing agents for the rubber, tumbling the resultant powder mixture and spraying into the agitated mixture a latex of a vulcanizable rubber, the quantity and rubber solids concentration of said latex being sufficient to agglomerate the powdered components into pellets and to supply 100 parts by weight of the rubber, evaporating the water content of the latex from said pellets, working said pellets to form a homogeneous rubber mix, molding said mix and heating said mix to cure said rubber and resin.

2. In molding a hard, tough, conductive rubber composition, the method which comprises agglomerating substantially the entire rubber mix into pellets including the steps of mixing together 60 to 100 parts by weight of powdered thermosetting cashew nutshell oil-phenol aldehyde resin, from 70 to 120 parts by weight of powdered conductive carbon black and powdered vulcanizing agents for the rubber, agitating the resultant powder mixture and spraying into the agitated mixture a 30% to 60% solids latex of a butadiene acrylonitrile copolymer synthetic rubber containing from about 30% to 45% acrylonitrile, the quantity and rubber solids concentration of said latex being sufficient to agglomerate the powdered components into pellets and to supply 100 parts by weight of said synthetic rubber copolymer, evaporating the water content of the latex from said pellets, working said pellets to form a homogeneous rubber mix, adding and mixing in curing agent for said resin to said rubber mix, molding said mix and heating said mix to cure said rubber and resin.

3. As an article of manufacture for reduction to a continuous milled rubber mix with a minimum of working, a body of firm, readily crumbled granules, each granule comprising dry, powdered components including vulcanizing agents, from 60 to 100 parts by weight of thermosetting phenol aldehyde resin and from 70 to 120 parts by weight of conductive carbon black held together by 100 parts by weight of rubber solids and said body of granules being formed by mixing together the powdered components, tumbling the resultant powder mixture, spraying into the agitated mixture a latex of a rubber to agglomerate the powdered components into granules and evaporating the water content of the latex from said granules and said granules comprising the complete rubber requirements of a rubber mix for milling and molding.

4. As an article of manufacture for reduction to a continuous milled rubber mix with a minimum of working, a sheet of cohered firm, readily crumbled granules, each granule comprising dry, powdered components including vulcanizing agents, from 60 to 100 parts by weight of thermosetting phenol aldehyde resin and from 70 to 120 parts by weight of conductive carbon black held together by 100 parts by weight of rubber solids and said sheet of granules being formed by mixing together the powdered components, tumbling the resultant powder mixture, spraying into the agitated mixture a latex of a rubber to agglomerate the powdered components into granules, spreading said granules in a layer, evaporating the water content of said latex to cause said granules to cohere in a sheet and said sheet comprising the complete rubber requirements of a rubber mix for milling and molding.

5. As an article of manufacture for reduction to a milled continuous rubber mix with a minimum of working, a body of firm, readily crumbled granules, each granule comprising dry, powdered components including from 60 to 100 parts by weight of powdered thermosetting phenol aldehyde resin, from 2 to 25 parts by weight of granular high molecular weight polyethylene glycol having a molecular weight of from 1000 to 6000, from 70 to 120 parts by weight of powdered conductive carbon black and powdered vulcanizing agents for the rubber held together by rubber solids and said body of granules comprising 100 parts by weight of the rubber solids, said granules being formed by mixing together the powdered components, tumbling the resultant powder mixture, spraying into the agitated mixture a latex of a rubber to agglomerate the powdered components into granules and evaporating the water content of the latex from said granules and said granules comprising the complete rubber requirement of a rubber mix for milling and molding.

6. As an article of manufacture for reduction to a milled continuous rubber mix with a minimum of working, a body of firm, readily crumbled granules, each granule comprising dry, powdered components including from 60 to 100 parts by weight of powdered thermosetting cashew nutshell oil-phenol aldehyde resin, from 70 to 120 parts by weight of powdered conductive carbon black, from 2 to 25 parts by weight of granular high molecular weight polyethylene glycol having a molecular weight of from 1000 to 6000 and powdered vulcanizing agents for the rubber, said powdered components being held together by butadiene acrylonitrile copolymer synthetic rubber solids, the copolymer comprising from 30% to 45% acrylonitrile and said body of granules comprising 100 parts by weight of said synthetic rubber copolymer, said granules being formed by mixing together the powdered components, tumbling the resultant powder mixture, spraying into the agitated mixture a latex of synthetic rubber to agglomerate the powdered components into granules, spreading said granules in a layer, evaporating the water content of said synthetic rubber latex to cause said granules to cohere in a sheet and said sheet comprising substantially the complete rubber requirement of a rubber mix for milling and molding.

7. A clean cutting, wear resistant conductive cutting pad having improved retention of conductivity comprising a smooth surfaced body of material, said material comprising the product of molding under sufficient heat and pressure to effect curing a mixture of 100 parts by weight of a rubber, a rubber reinforcing synthetic resin, from 70 to 120 parts by weight of a reinforcing carbon black, and from 2 to 25 parts by weight of a polyethylene glycol having a molecular weight of from 1000 to 6000.

8. A clean cutting, wear resistant conductive cutting pad having improved retention of conductivity comprising a smooth surfaced body of material, said material comprising the product of molding under sufficient heat and pressure to effect curing a mixture of 100 parts by weight of a rubbery copolymer, a rubber-reinforcing, thermosetting, synthetic resin, from 70 to 120 parts by weight of a reinforcing carbon black, and from 2 to 25 parts by weight of a polyethylene glycol having a molecular weight of from 1000 to 6000.

9. A clean cutting, wear resistant conductive cutting pad having improved retention of conductivity comprising a smooth surfaced body of material, said material comprising the product of molding under sufficient heat and pressure to effect curing, a mixture of 100 parts by weight of a rubbery butadiene-acrylonitrile copolymer containing at least 30% acrylonitrile, from about 60 to about 100 parts by weight of a reinforcing synthetic resinous reaction product of cashew nutshell oil and another phenol, sufficient aldehyde to make said resinous product thermosetting, from 70 to 120 parts by weight of a reinforcing carbon black, and from 2 to 25 parts by weight of a polyethylene glycol having a molecular weight of from 1000 to 6000, said cutting pad having a Shore-D hardness of from 60 to 85 and a tensile strength of at least 2500 pounds per square inch.

References Cited in the file of this patent

UNITED STATES PATENTS

| | | |
|---|---|---|
| 2,353,462 | Harkins | July 11, 1944 |
| 2,373,876 | Cutler | Apr. 17, 1945 |
| 2,427,238 | Stwart | Sept. 9, 1947 |
| 2,457,962 | Whaley | Jan. 4, 1949 |
| 2,538,809 | Grotenhuis | Jan. 23, 1951 |
| 2,548,332 | Alexander et al. | Apr. 10, 1951 |
| 2,598,289 | Newman | May 27, 1952 |
| 2,656,324 | Grotenhuis | Oct. 20, 1953 |

OTHER REFERENCES

"Carbowax," Carbon & Carbide Chem. Corp. pamphlet, 1946, page 6.